United States Patent [19]

Archer

[11] 4,281,374

[45] Jul. 28, 1981

[54] ELECTRICAL CIRCUIT FOR PRODUCING CONTROLLED HIGH VOLTAGE AC OUTPUT

[75] Inventor: William R. Archer, Fort Wayne, Ind.

[73] Assignee: General Electric Company, Salem, Va.

[21] Appl. No.: 42,766

[22] Filed: May 29, 1979

[51] Int. Cl.³ .............................................. H02M 1/12
[52] U.S. Cl. ........................................ 363/41; 363/97
[58] Field of Search ..................................... 363/24–26, 363/40–41, 64, 95–98, 131–134

[56] References Cited

U.S. PATENT DOCUMENTS

| 3,582,754 | 6/1971 | Hoffmann | 363/18 |
| 3,670,234 | 6/1972 | Joyce | 363/134 X |
| 4,017,784 | 4/1977 | Simmons et al. | 363/98 X |

Primary Examiner—William M. Shoop
Assistant Examiner—Peter S. Wong
Attorney, Agent, or Firm—J. H. Beusse

[57] ABSTRACT

An electrical circuit for providing an adjustable and highly controllable, high voltage AC waveshape to a load from a low-voltage, DC source. This highly controlled waveshape allows accurate reproduction of almost any low-frequency AC reference through an intermediate high-frequency inverter. The inherent leakage reactance of a high-voltage transformer is used advantageously as a filter for removing the undesired high-frequency component from the output. Economy in parts count and power losses results from the use of a single power handling inverter to perform all adjust, regulation, and waveshape functions.

3 Claims, 4 Drawing Figures

ELECTRICAL CIRCUIT FOR PRODUCING CONTROLLED HIGH VOLTAGE AC OUTPUT

BACKGROUND OF THE INVENTION

1. Field of the Invention

The present invention relates to an improved electrical circuit for driving a complex AC load from a DC source, and more particularly, to such an electrical circuit including an inverter and a high-reactance transformer in circuit with a closed-loop feedback control for producing, from a low, DC input voltage, a controlled high-voltage AC output.

2. Description of the Prior Art

To produce high-voltage AC for driving a complex load, that is a load comprising a resistor in parallel with a stray capacitance, such that the output voltage has a controlled and repeatable rise time, the usual method is to drive a conventional high-voltage transformer from a two-transistor AC inverter. Such an inverter operates at the desired output frequency, which may be 400–600 Hz, typically, and the output voltage magnitude is controlled by adjusting the DC voltage applied to the input of the inverter. Such usually requires a separate control circuit. Because of the inherent leakage reactance resulting from the magnetics of the high-reactance, high-voltage transformer, combined with the stray capacitance of the high-voltage coil and the load, a natural L-C tank circuit is formed. This L-C tank tends to "ring" or self-oscillate causing high peak output voltages and poor crest factor. The high peak to average ratio thus formed tends to increase the chance of random breakdown or arcing. The usual solution to minimize the effect of this L-C tank is to add a large bleeder to the output. Such a bleeder, however, is costly and consumes substantial power.

It is desirable to eliminate the use of such a bleeder as well as the DC pre-regulator in such a circuit for producing a high-voltage AC output.

It is an object of the present invention, therefore, to provide such an electrical circuit for producing a high-voltage AC output from a low-voltage DC input and which eliminates the use of a bleeder as well as a DC pre-regulator.

It is a further object of the present invention to provide such an electrical circuit whereby the unavoidable L-C components of the high-reactance transformer are used to best advantage in the circuit.

SUMMARY OF THE INVENTION

In accordance with the present invention, there is provided an electrical circuit for producing from a DC input voltage a controlled high-voltage AC output. Input means are provided for connection to a source of DC electrical energy and an inverter is provided for converting the DC electrical energy to high-frequency AC electrical energy, the inverter including control means for controlling its duty cycle. Connected to the output of the inverter is a high-reactance transformer serving to raise to high voltage the low-frequency component and for attenuating the high-frequency component of the AC electrical energy produced by the inverter. Output means are connected to the output of the transformer for providing means for connection to a load and means are provided for sampling the output voltage of the circuit. Also included is a reference voltage source and means for comparing the sampled circuit output voltage with the reference voltage for providing a signal to the inverter control means to turn on the inverter when the sampled voltage is lower than the reference voltage and to turn off the inverter when the sampled circuit output voltage is greater than the reference voltage. In one form of the preferred embodiment, there is also included a high-frequency oscillator for producing a high-frequency waveform and a pulse-width modulator connected between the inverter and the comparing means for comparing the high-frequency waveform with the signal from the comparing means thereby to provide a train of high-frequency pulses to the inverter controller, the pulse-width thereof varying as a function of the amplified difference between the reference voltage and the sampled circuit output voltage.

DESCRIPTION OF THE PREFERRED EMBODIMENT

Figure 1:
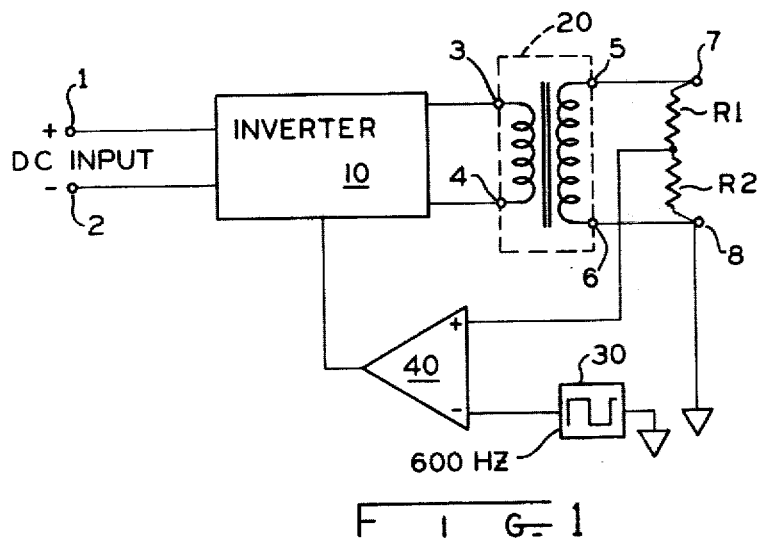
FIG. 1 shows by schematic representation in block form the preferred embodiment of the electrical circuit of the present invention.

In accordance with the present invention and referring to FIG. 1, there is shown the preferred embodiment of an electrical circuit for producing from a low DC input voltage a controlled high-voltage AC output. (Hereinafter, high voltage is designated as one kilovolt or greater.) Input means are provided in the form of a pair of input terminals 1 and 2 for connection to a source of DC electrical energy. An inverter 10 is provided for converting the DC electrical energy to high-frequency AC electrical energy. Inverter 10 includes control means for controlling inverter duty cycle. A high-reactance transformer 20 is connected to the output of inverter 10 through terminals 3 and 4, the transformer serving to raise to high voltage the low-frequency component of the AC electrical energy produced by the inverter and for attenuating the high-frequency component of that AC electrical energy, also produced by the inverter. High-reactance transformer 20 also includes a pair of output terminals 5 and 6. Output means are provided in the form of a pair of circuit output terminals 7 and 8 connected to the respective transformer output terminals 5 and 6, output terminals 7 and 8 providing means for connection to a load (wich may be a complex load). Means are provided for sampling the output voltage of the circuit, this taking the form of a voltage divider including resistors R1 and R2 connected across the circuit output terminals 7 and 8. Included is a reference voltage source taking the form of 600 Hz square wave source 30. Means are also provided for comparing sampled circuit output voltage, that is a voltage picked off the voltage divider of resistors R1 and R2, with the 600 Hz reference voltage, thence to provide a signal to the inverter control means to turn on the inverter 10 when the sampled voltage is lower than the reference voltage (absolute value) and to turn off the inverter when the sampled voltage is greater than the reference voltage (absolute value). Such includes comparator 40 the output of which is connected to the inverter 10, the positive input terminal of which is connected to receive the sampled circuit output voltage and the negative terminal of which is connected to recieve the 600 Hz square wave signal.

The circuit of FIG. 1 is of the closed loop feedback control type, and particularly of the free-running type. Comparator 40 is of the high-gain type which operates as a switch. If the sampled circuit voltage taken from the junction of resistors R1 and R2 is greater than the absolute value of reference voltage from source 30, comparator 40 turns the inverter 10 off for that polarity. If the sampled circuit voltage is lower, comparator 40 turns on the inverter 10. This system oscillates at high-frequency but always adjusts the duty cycle of the inverter so as to make the voltage sampled on the voltage divider the same as the desired reference voltage. It should be noted that the reference voltage could be of virtually any waveshape (sine, square, triangular, etc.) so long as the power transformer 20 is not over-driven.

The equivalent circuit of a typical high-voltage, high-reactance transformer includes an inherent leakage reactance typically drawn as an impedance in circuit with one leg of the transformer output and a stray capacitance connected across both legs of the transformer output. This leakage reactance results in part due to the high turns ratio of the transformer, and the stray capacitance is due mainly to the large number of secondary or high-voltage turns on that transformer. The circuit of such a high-reactance transformer behaves quite like a low pass 40 db decade filter section. The subject invention utilizes this feature.

Figure 2:
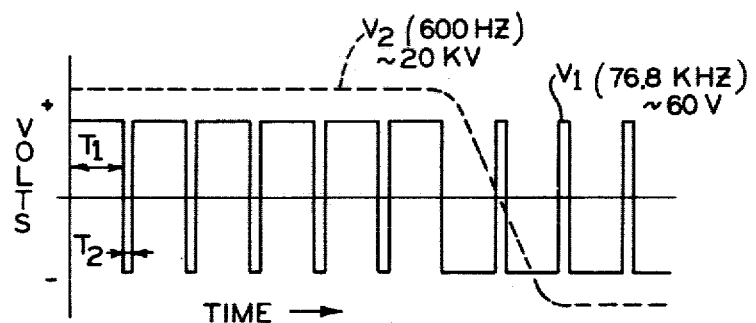
FIG. 2 showns graphically the waveforms of the circuits of FIGS. 1 and 2.

By building an inverter which operates at some high-frequency, such as 70 to 80 KHz, with respect to the desired operating frequency of say 600 Hz, we may synthesize the desired output. Referring now to FIG. 2, if for example the desired circuit output at terminals 7 and 8 of FIG. 1 is a 600 Hz squarewave $V_2$, and the high-frequency waveform $V_1$ from the inverter 10 at terminals 3 and 4 of FIG. 1 is in the 70 to 80 KHz range, the waveforms would appear as shown. By controlling the times T1 and T2, the magnitude of the output voltage $V_2$ may be controlled. This is precisely what the circuit of FIG. 1 accomplishes. It should be noted, however, that for the sake of convenience, the amplitude of voltage waveforms $V_1$ and $V_2$ are not relative. That is, $V_2$ is in the 20 KV range, while $V_1$ is in the 60-volt peak to peak range.

Figure 3:
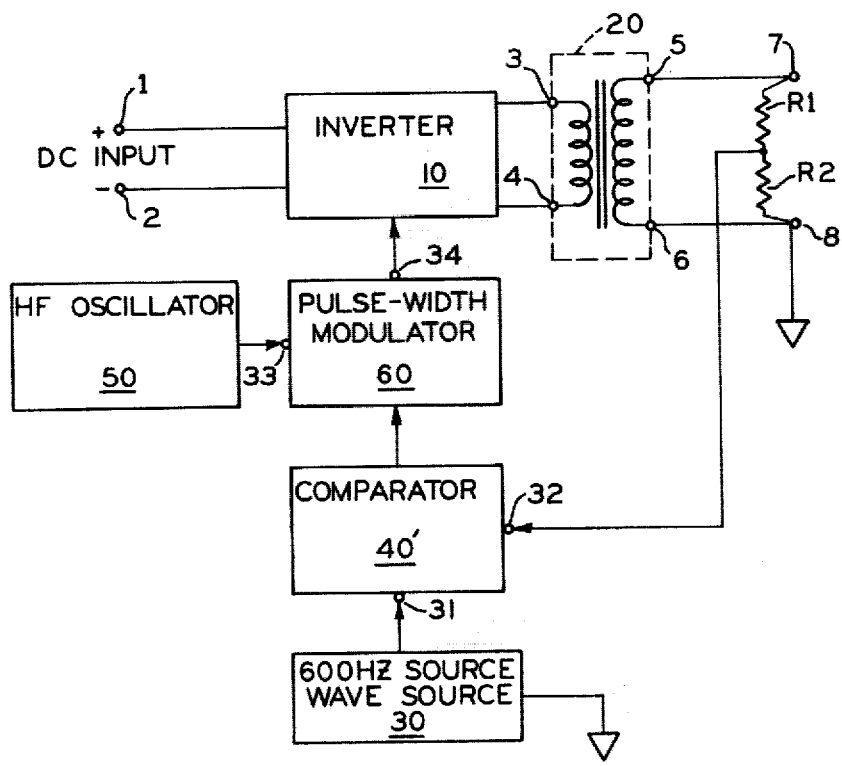
FIG. 3 shows in block form another form of the preferred embodiment of the electrical circuit of the present invention.

Referring now to FIG. 3, there is shown an electrical circuit of the type shown in FIG. 1, however, FIG. 3 being provided with a pulse-width modulator 60 connected between the inverter 10 and comparator 40' for comparing a high-frequency waveform from a high-frequency oscillator 50 with the signal from the comparing means thus to provide a train of high-frequency pulses to the inverter controller 10, the pulse-width thereof varying as a function of the amplified difference between the reference voltage and the sampled circuit output voltage.

Figure 4:
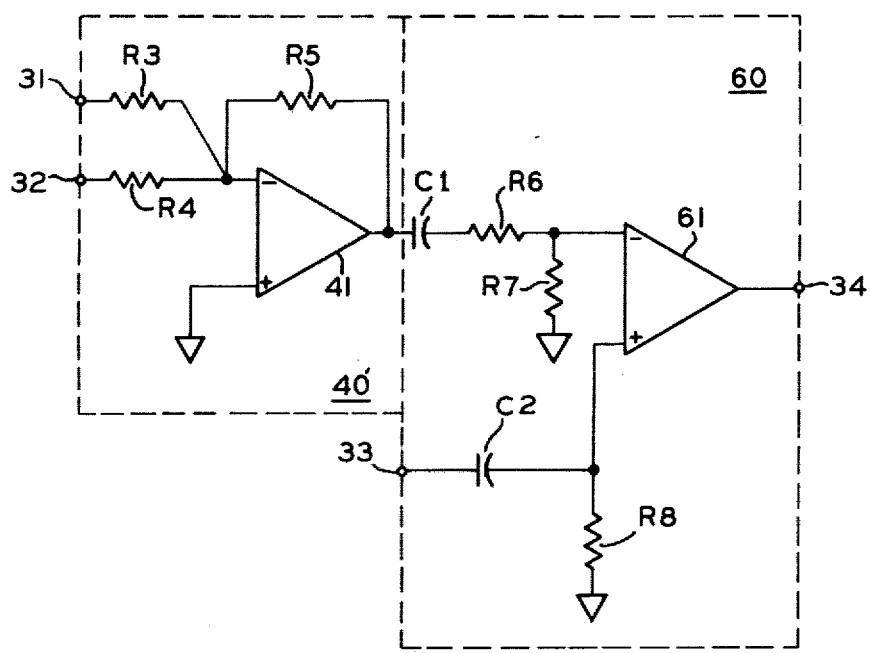
FIG. 4 is a detailed schematic representation of certain portions of the circuit of FIG. 3.

In FIG. 4 there is shown in more detail the circuit of comparator 40' and the pulse-width modulator 60 of FIG. 3. It will be noted that the 600 Hz reference voltage is compared to the sampled circuit output voltage taken at the junction of resistors R1 and R2, the intent being to have the divider output an exact duplicate of the 600 Hz reference voltage. In FIG. 4, comparator 41 corresponds to comparator 40 in FIG. 1, while amplifier 61, forming a part of the pulse-width modulator 60, compares the output of comparator 41 with a 76.8 KHz triangular wave produced by the high-frequency oscillator 50. The output therefore of amplifier 61 is a train of rectangular voltage pulses (as seen in FIG. 2) which have a frequency of 76.8 KHz but whose pulse-width varies according to the amplified difference between the 600 Hz reference voltage and the sampled circuit output voltage. Pulsewidth modulator 60 could operate at any reasonable frequency so long as it is high (i.e., greater than 10 times) relative to the 600 Hz base frequency. The output of the amplifier 61 drives the inverter controller forming a part of the inverter 10.

The electrical circuit heretofore disclosed uses the normally undesirable features of a high-leakage reactance transformer with a high-efficiency switching regulator to produce a very accurately controlled and adjustable high-voltage output. As such, it is suitable for free-running or fixed frequency modulators and is quite flexible in capability of driving complex loads; i.e., loads having resistive and capacitive components in parallel with one another.

The circuits shown in FIGS. 1, 3, and 4 have been built and satisfactorily operated with components having the following model designations and/or values:

FIG. 1 Transformer 20 primary: 33 turns, 0.0427" dia. conductor, bobbin random wound.
secondary: 20,000 turns, 0.0025" dia. conductor, layer wound 200 turns/layer.
core: Arnold #AH239 wound core, 6 mil air gap.
Comparator 40—¼-LM 339, National Semiconductor
Resistor R1—100 K ohm, 20 KV
Resistor R2—30 ohm, ¼W

FIG. 3

Transformer 20—same as for FIG. 1
Resistors R1, R2—same as for FIG. 1

FIG. 4

Comparator 41—¼-LM 324, National Semiconductor
Amplifier 61—¼-LM 339, National Semiconductor
Resistor R3—33 K ohms, ¼W  R4—18 K ohms, ¼W
  R5—240 K ohms, ¼W  R6—10 K ohms, ¼W
  R7,R8—100 K ohms, ¼W
Capacitors C1—0.1 μF., 50 V
Capacitors C2—150 pF, 50 V It will be recognized by those skilled in the art that many different types of inverters may be used in such an electrical circuit as disclosed herein. Within the contemplation of the invention is use of a full bridge inverter, using any of a number of different kinds of switches, and a center-tapped inverter, among others, the basic requirements being that the inverter must handle reactive load currents.

It should be apparent to those skilled in the art that the embodiment described heretofore is considered to be the presently preferred form of the invention. In accordance with the patent statutes, changes may be made in the disclosed device and the manner in which it is used without actually departing from the true spirit and scope of the invention.

What is claimed is:

1. A power supply for producing high voltage AC output power at a relatively low base frquency from relatively low voltage DC input power, comprising:

a pulse-width modulated inverter for converting the DC input power to a pulse width modulated power signal, said inverter chopping the DC input power at a frequency relatively high with respect to the base frequency;

a voltage step-up transformer having high inductive and capacitive reactance at the chopping frequency, said transformer including a primary winding connected to said inverter for receiving said power signal and a secondary winding for developing the high-voltage AC output power, the reactance of said transformer serving to filter the high-frequency component of said power signal while raising to high voltage the base frequency component of said power signal;

means for sensing the voltage magnitude of said AC output power and for generating a voltage signal representative thereof;

a reference voltage source for producing a reference voltage representative of a desired voltage magnitude of the AC output power; and means for comparing said voltage signal to said reference voltage, said comparing means providing a signal to said inverter for varying the duty cycle of said power signal as a function of the difference between the magnitude of said reference voltage and the magnitude of said voltage signal thereby to adjust said voltage magnitude of said AC output power in a manner to minimize said difference.

2. The power supply of claim 1 further comprising:
a high-frequency oscillator for producing a high-frequency waveform at said chopping frequency; and
a pulse-width modulator connected between said inverter and said comparing means for comparing said high-frequency waveform with said signal from said comparing means for providing a train of high-frequency pulses to said inverter, the pulse-width thereof varying as a function of the amplier difference between said reference voltage and said voltage signal.

3. The power supply of claim 1 wherein said chopping frequency is at least ten times the frequency of said AC output power.

* * * * *